US011025942B2

United States Patent
Sheikh et al.

(10) Patent No.: US 11,025,942 B2
(45) Date of Patent: Jun. 1, 2021

(54) PROGRESSIVE COMPRESSED DOMAIN COMPUTER VISION AND DEEP LEARNING SYSTEMS

(71) Applicant: Samsung Electronics Co., Ltd., Suwon-si (KR)

(72) Inventors: Hamid R. Sheikh, Allen, TX (US); Youngjun Yoo, Plano, TX (US); Michael Polley, Garland, TX (US); Chenchi Luo, Plano, TX (US); David Liu, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/892,141

(22) Filed: Feb. 8, 2018

(65) Prior Publication Data

US 2019/0246130 A1 Aug. 8, 2019

(51) Int. Cl.
*H04N 19/48* (2014.01)
*H04N 19/167* (2014.01)
(Continued)

(52) U.S. Cl.
CPC ............. *H04N 19/48* (2014.11); *H04N 19/11* (2014.11); *H04N 19/167* (2014.11); *H04N 19/44* (2014.11)

(58) Field of Classification Search
CPC ....... H04N 19/48; H04N 19/11; H04N 19/167
See application file for complete search history.

(56) References Cited

U.S. PATENT DOCUMENTS 6,545,705 B1 * 4/2003 Sigel ..................... G07C 1/24
348/157
9,924,165 B1 * 3/2018 Kohn ............... H04N 19/00527
(Continued)

FOREIGN PATENT DOCUMENTS

EP 1173020 A2 1/2002
WO 9933275 A1 7/1999

OTHER PUBLICATIONS

International Search Report and Written Opinion regarding International Application No. PCT/KR2018/005471, dated Nov. 7, 2018, 9 pages.
(Continued)

*Primary Examiner* — James T Boylan (57) ABSTRACT

Methods and systems for compressed domain progressive application of computer vision techniques. A method for decoding video data includes receiving a video stream that is encoded for multi-stage decoding. The method includes partially decoding the video stream by performing one or more stages of the multi-stage decoding. The method includes determining whether a decision for a computer vision system can be identified based on the partially decoded video stream. Additionally, the method includes generating the decision for the computer vision system based on decoding of the video stream. A system for encoding video data includes a processor configured to receive the video data from a camera, encode the video data received from the camera into a video stream for consumption by a computer vision system, and include metadata with the encoded video stream to indicate whether a decision for the computer vision system can be identified from the metadata.

20 Claims, 5 Drawing Sheets

(51) Int. Cl.
*H04N 19/11* (2014.01)
*H04N 19/44* (2014.01)

(56) References Cited

U.S. PATENT DOCUMENTS

| | | | |
|---|---|---|---|
| 2004/0088557 A1 | 5/2004 | Malcolm et al. | |
| 2006/0215753 A1* | 9/2006 | Lee | H04N 7/147 375/240.08 |
| 2010/0040299 A1 | 2/2010 | Noh et al. | |
| 2010/0110199 A1 | 5/2010 | Winkler et al. | |
| 2010/0142617 A1 | 6/2010 | Koo et al. | |
| 2010/0246679 A1 | 9/2010 | Dey et al. | |
| 2012/0147200 A1* | 6/2012 | Watanabe | H04N 5/232 348/207.11 |
| 2012/0213409 A1 | 8/2012 | El-Maleh et al. | |
| 2015/0023407 A1* | 1/2015 | Sato | H04N 19/44 375/240.02 |
| 2015/0281715 A1 | 10/2015 | Lawrence et al. | |
| 2016/0119619 A1 | 4/2016 | Amer | |
| 2016/0234523 A1 | 8/2016 | Hattori et al. | |
| 2016/0247250 A1 | 8/2016 | Mendhekar | |
| 2016/0350061 A1 | 12/2016 | Turner et al. | |
| 2017/0006307 A1 | 1/2017 | Hsieh et al. | |
| 2017/0019679 A1 | 1/2017 | Wang et al. | |
| 2017/0041605 A1 | 2/2017 | Watanabe | |
| 2017/0118540 A1* | 4/2017 | Thomas | H04N 21/85406 |
| 2019/0034235 A1* | 1/2019 | Yang | G06K 9/00369 |
| 2019/0222851 A1* | 7/2019 | Ferrara | H04N 19/17 |

OTHER PUBLICATIONS

Lee et al., "Efficient Partial Decoding Algorithm for High Efficiency Video Coding", ICSNC 2015 : The Tenth International Conference on Systems and Networks Communications, Nov. 2015, pp. 99-102.

Meng et al., "Scene Change Detection in a MPEG Compressed Video Sequence", IS&T/SPIE Symposium Proceedings, vol. 2419, Feb. 1995, 12 pages.

Venkatesh et al., "Compressed Domain Human Motion Recognition Using Motion History Information", Proceedings of International Conference on Acoustics, Speech and Signal Processing, Apr. 2003, 4 pages.

Supplementary European Search Report dated Sep. 4, 2020 in connection with European Patent Application No. 18905082.6, 9 pages.

* cited by examiner

PROGRESSIVE COMPRESSED DOMAIN COMPUTER VISION AND DEEP LEARNING SYSTEMS

TECHNICAL FIELD

This disclosure relates generally to computer vision and deep learning systems. More specifically, this disclosure relates to compressed domain progressive application of computer vision techniques.

BACKGROUND

Processing camera video streams using computer vision and deep learning (CV/DL) techniques is an upcoming and explosive area of artificial intelligence (AI) and machine learning (ML). The application level goal is to automatically perform various tasks by observing a video stream, such as user aware applications, e-commerce, social media, visual awareness, surveillance and security, navigation, etc. These applications use a variety of underlying CV techniques such as object detection and recognition, object tracking, human detection and tracking, etc. DL and convolutional neural networks (CNNs) are a set of highly valuable techniques that has been shown to provide significant improvements in detection rates over traditional CV techniques.

SUMMARY

Embodiments of the present disclosure provide for progressive compressed domain CV and DL systems.

In one embodiment, a method for decoding video data is provided. The method includes receiving a video stream that is encoded for multi-stage decoding. The method includes partially decoding the video stream by performing one or more stages of the multi-stage decoding. The method includes determining whether a decision for a CV system can be identified based on the partially decoded video stream. Additionally, the method includes generating the decision for the CV system based on decoding of the video stream.

In another embodiment, a system for decoding video data is provided. The system includes a communication interface and a processor operably connected to the communication interface. The communication interface is configured to receive a video stream that is encoded for multi-stage decoding. The processor is configured to partially decode the video stream by performing one or more stages of the multi-stage decoding, determine whether a decision for a CV system can be identified based on the partially decoded video stream, and generate the decision for the CV system based on decoding of the video stream.

In another embodiment, a system for encoding video data is provided. The system includes a processor configured to receive the video data from a camera, encode the video data received from the camera into a video stream for consumption by a CV system, and include metadata with the encoded video stream to indicate whether a decision for the CV system can be identified from the metadata. The system also includes a communication interface operably connected to the processor. The communication interface is configured to transmit the encoded video stream and the metadata to a decoder for the CV system.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the present disclosure further recognize and take into consideration that one difficulty with DL and CNN techniques is that these techniques are computationally challenging. This is especially true for continuous application of CV techniques to an incoming video stream. Moreover, in order to embed these techniques into power-optimized applications, the video streams to be analyzed have to be prepared for such techniques to be used. At a minimum, a typical compression based video stream (e.g., such as high efficiency video coding (HEVC) or H.265 encoded video stream) has to be completely decoded before any DL/CNN techniques can be applied. This can add a lot of computational cost especially in scenarios of a continuous video recording where most of the video stream is not expected to contain meaningful information. In such a scenario, even the detection of whether the video stream contains meaningful information would require full decoding of the incoming video stream. Additionally, embodiments of the present disclosure recognize that current codecs are designed to be optimized for compression performance and not for optimized downstream consumption by CV/DL based AI systems.

Embodiments of the present disclosure further recognize and take into consideration that such most video encoding is optimized for human consumption and compression. This is, most video encoding techniques for video streams attempt to convey the most information, for example, in the form of image clarity, color, and contrast, to the human eye in the least amount of data to reduce bandwidth and storage requirements. Such video encoding techniques (and the decoding techniques therefore) are not optimized or designed for consumption utilizing CV. As a result, using these techniques, unnecessary video processing occurs resulting in unnecessary power usage.

Accordingly, embodiments of the present disclosure provide for progressive compressed domain application of CV and DL systems. In so doing, various embodiments significantly reduce the complexity and power consumption for video consumption in CV applications. Embodiments of the progressive compressed domain decoding system disclosed herein may be implemented in or utilized by any number of different systems or applications. For example, without limitation, such systems or applications may include CV, DL, and AI. In the interests of brevity, certain descriptions of the present disclosure may discuss implemented in or utilized by a CV system or decoding system. However, such descriptions are equally applicable to other systems or applications of implementing or utilizing the progressive compressed domain decoding system of the present disclosure including both DL and AI and the terms CV, DL, and AI may be used interchangeably in this disclosure.

Figure 1:
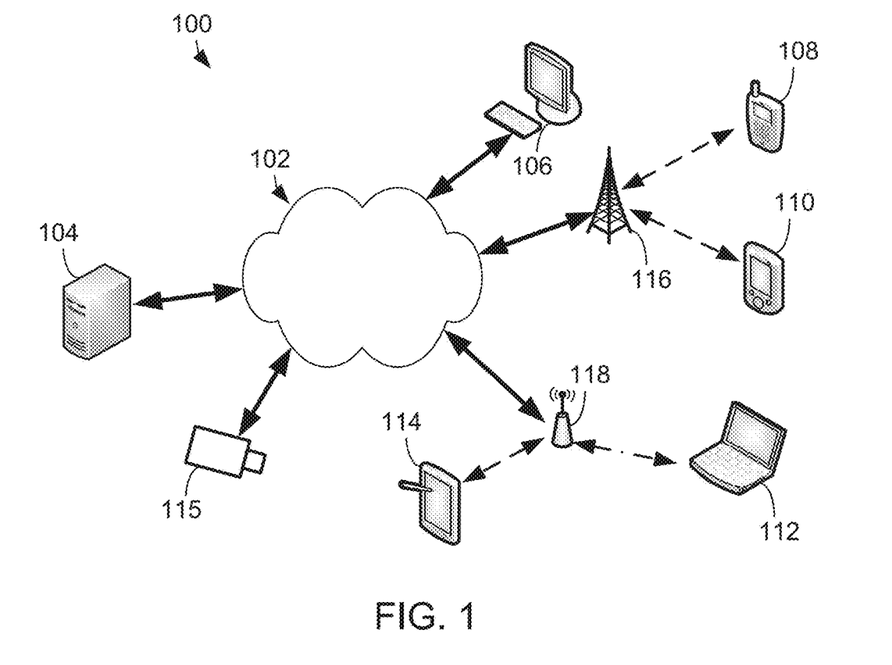
FIG. 1 illustrates an example networked system in which various embodiments of the present disclosure may be implemented.

FIG. 1 illustrates an example networked system 100 in which various embodiments of the present disclosure may be implemented. The embodiment of the networked system 100 shown in FIG. 1 is for illustration only. Other embodiments of the networked system 100 could be used without departing from the scope of this disclosure.

As shown in FIG. 1, the system 100 includes a network 102, which facilitates communication link(s) between various components in the system 100. For example, the network 102 may communicate Internet Protocol (IP) packets or other information between network addresses. The network 102 may include one or more local area networks (LANs); metropolitan area networks (MANs); wide area networks (WANs); all or a portion of a global network, such as the Internet; or any other communication system or systems at one or more locations.

The network 102 facilitates communications between at least one server 104 and various other electronic devices 106-115. Each server 104 includes any suitable electronic, computing, and/or processing device that can provide computing services for one or more client devices. Each server 104 could, for example, include one or more processing devices, one or more memories storing instructions and data, and one or more network interfaces facilitating communication over the network 102. For example, server 104 may operate one or more applications to encode and/or decode video data for progressive compressed domain application of CV and DL systems.

Each electronic device 106-115 represents any suitable electronic computing or processing device that interacts with the server 104 or other electronic device(s) over the network 102. In this example, the electronic devices 106-115 include a desktop computer 106, a mobile telephone or smartphone 108, a personal digital assistant (PDA) 110, a laptop computer 112, a tablet computer 114, a camera system 115, etc. However, any other or additional electronic devices could be used in the networked system 100. In various embodiments, electronic devices 106-115 implement techniques for the encoding and/or decoding video data for progressive compressed domain application of CV and DL systems as discussed in greater detail below. For example, the camera system 115 may include one or more video camera(s) that output an encoded video stream for decoding by any one of the server 104 or one or more of the electronic devices 106-114.

In this example, some electronic devices 108-114 use communication link(s) to communicate indirectly with the network 102. For example, the electronic devices 108-110 communicate via one or more base stations 116, such as cellular base stations or eNodeBs. Also, the electronic devices 112-115 use communication link(s) to communicate via one or more wireless access points 118, such as IEEE 802.11 wireless access points. Note that these are for illustration only and that each electronic device could communicate using direct communication link(s) to the network 102 or indirectly with the network 102 via any suitable intermediate device(s) or network(s).

Although FIG. 1 illustrates one example of a networked system 100, various changes may be made to FIG. 1. For example, the system 100 could include any number of each component in any suitable arrangement. In general, video encoding and decoding systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
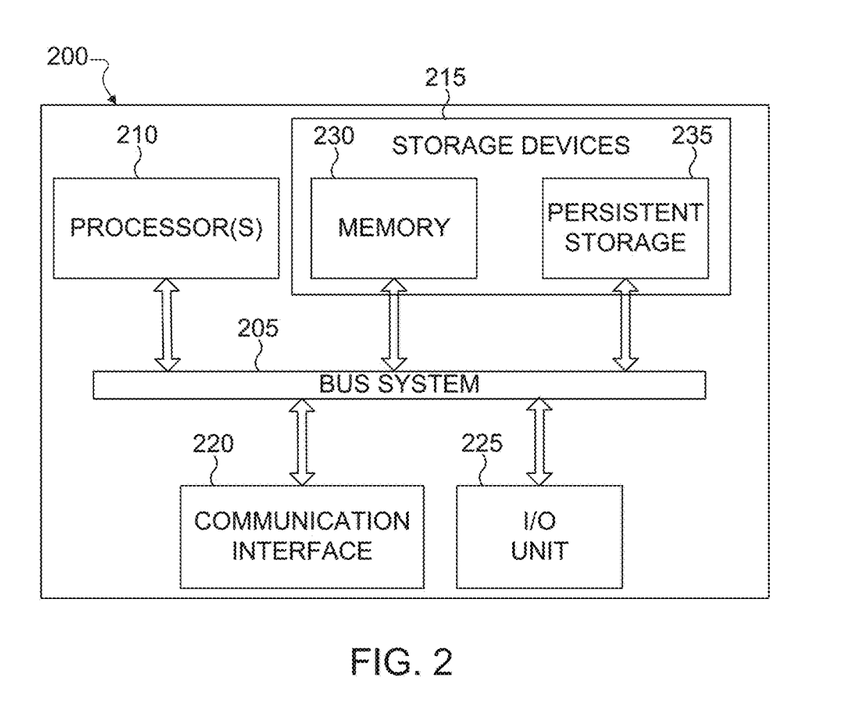
FIG. 2 illustrates an example of a processing system in which various embodiments of the present disclosure may be implemented.

FIG. 2 illustrates an example processing system 200 in a networked system according to various embodiments of the present disclosure in which various embodiments of the present disclosure may be implemented. For example, in various embodiments, the processing system 200 in FIG. 2 is a processing device that performs video stream encoding or decoding to implement progressive compressed domain application of CV and DL systems. In this illustrative example, the processing system 200 represents any one of the server 104 or one or more of the electronic devices 106-115 in FIG. 1. For example, the processing system 200 may be an encoding device that is connected to or includes the camera system 115 to encode a video stream according to one or more embodiments of the present disclosure. In another example, the processing system 200 may be an decoding device that is connected to or is included within the server 104 or one or more of the electronic devices 106-114 to decode a video stream and/or implement progressive compressed domain application of CV and DL systems according to one or more embodiments of the present disclosure.

As shown in FIG. 2, the processing system 200 includes a bus system 205, which supports communication between processor(s) 210, storage devices 215, communication interface 220, and input/output (I/O) unit 225. The processor(s) 210 executes instructions that may be loaded into a memory 230. The processor(s) 210 may include any suitable number(s) and type(s) of processors or other devices in any suitable arrangement. Example types of processor(s) 210 include microprocessors, microcontrollers, digital signal processors, field programmable gate arrays, application specific integrated circuits, and discreet circuitry. In some embodiments, the processor(s) 210 may be implemented as a decoder or encoder to implement the progressive compressed domain application of CV and DL systems as discussed in greater detail below.

The memory 230 and a persistent storage 235 are examples of storage devices 215, which represent any structure(s) capable of storing and facilitating retrieval of information (such as for buffering of a video stream, program code, and/or other suitable information on a temporary or permanent basis). The memory 230 may represent a random access memory or any other suitable volatile or non-volatile storage device(s). For example, as discussed below, the memory 230 contains instructions for a CV or AI application that performs tasks based on decoded or partially decoded video streams. In another example, the memory 230 contains instructions for implementing a hierarchical/progressive decoder for CV and DL systems. The persistent storage 235 may contain one or more components or devices supporting longer-term storage of data, such as a read-only memory, hard drive, Flash memory, or optical disc.

The communication interface 220 supports communications with other systems or devices. For example, the communication interface 220 could include a network interface card or a wireless transceiver facilitating communications over the network 101. The communication interface 220 may support communications through any suitable physical or wireless communication link(s), for example, to or from an encoder device or decoder device. The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

Although FIG. 2 illustrates one example of a processing system 200, various changes may be made to FIG. 2. For example, various components in FIG. 2 could be combined, further subdivided, or omitted and additional components could be added according to particular needs.

As will be discussed in greater detail below, embodiments of the present disclosure provide for progressive compressed domain application of CV and DL systems. Embodiments of the present disclosure can significantly reduce the complexity of continuous low power video vision by utilizing the compressed domain progressive application of CV techniques. In particular, various embodiments use DL techniques on partially decoded video streams, in other words, compressed-domain DL. Various embodiments provide the progressive decoding of additional parts of the encoded video stream based on decisions in previous detection stages, including region of interest (ROI) extraction.

Further embodiments provide for a video encoding scheme where additional information is encoded into the bitstream to allow for improved CV/DL performance. Various embodiments provide an encoding scheme that pre-determines regions of interests and encodes the pre-determined regions to be decoded without requiring the decoding of the entire frame for downstream CV/DL systems. Further embodiments provide an encoding scheme where the encoder is configured by downstream CV/DL system to optimize or improve the encoding of side information or ROI selection to preferred CV/DL tasks such as, for example, human detection or hand detection. Various embodiments further provide for an encoder that utilizes a spatial transform that is designed or optimized for CNN/DL tasks.

Figure 3A:
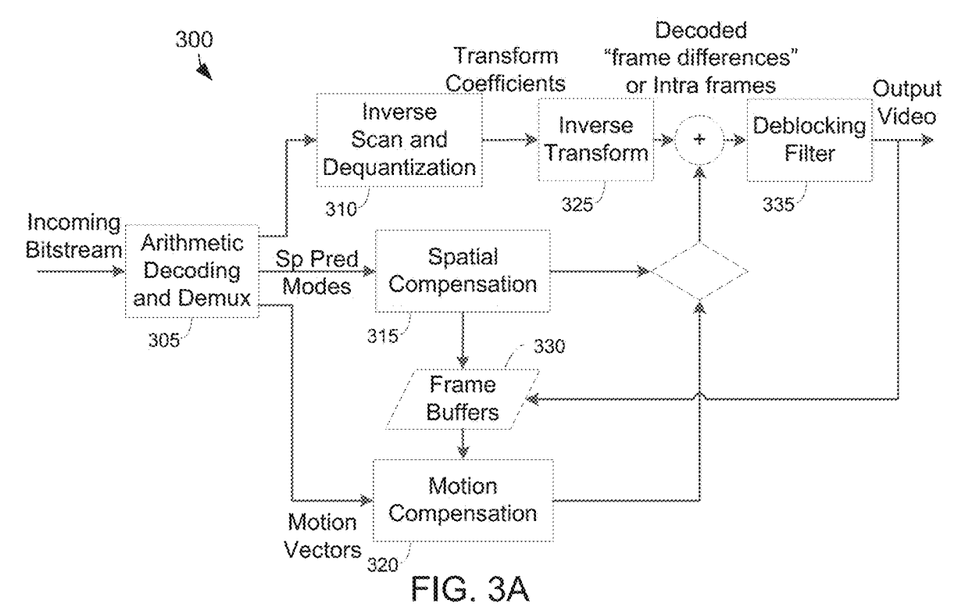
FIG. 3A illustrates an example of a block diagram for a video decoder system.

FIG. 3A illustrates an example of a block diagram for a video decoder system 300. For example, such a video decoder system 300 may be used to decode video for human consumption that has encoded using a coding standard such as advanced video coding (AVC or H.264) or HEVC/H.265. The video decoder system 300 includes multiple stages implemented by different blocks to fully decode an encoded video stream.

To decode an incoming bitstream, the arithmetic decoding and demultiplexing (demux) block 305 performs arithmetic decoding and demultiplexing and provides the output to the inverse scan and dequantization block 310. The inverse scan and dequantization block 310 performs an inverse scan on and de-quantizes the received input. The spatial compensation block 315 performs spatial compensation according to spatial prediction modes received from block 305. The motion compensation block 320 receives motion vectors from block 305 and performs motion compensation between frames that are buffered in block 330 from block 315 as well as the output video from the system 300. The inverse transform block 325 performs an inverse transform on the output of block 310, which is summed with the output from the spatial and motion compensation blocks 315 and 320 to produce decoded frame differences or intra frames. These are de-blocked by the deblocking filter block 355 to produce the resultant output video.

As discussed above, video decoding is very complex and requires a lot of computational resources. This is even more true of the later stages of the decoder system 300 such as motion compensation block 320 and deblocking filter block 335, while the early stages, such as the arithmetic decoding and demuxing done by block 305, of the decoder system 300 are relatively less complex from a computational standpoint.

For many CV or AI tasks, embodiments of the present disclosure recognize full pixel domain information is not needed, and systems performing CV or AI processes or tasks can obtain useful information from a partially decoded video stream. For example, the decoded motion vectors from a video stream can be used to identify areas of moving objects and their relative motion. This occurs relatively early in the decoding process and can result in enough information for a CV or AI application to perform a required task. Similarly, transform coefficients can be used (before or after dequantization) to identify areas of important spatial information such as highly textured regions etc. Additionally, according to embodiments of the present disclosure, CV techniques (such as CNNs) are retrained to process such partially decoded information to operate on motion vectors, transform coefficients, and/or decode frame differences/intra predicted frames to extract relevant information to perform a required task without needing to decode the entire video stream.

Figure 3B:
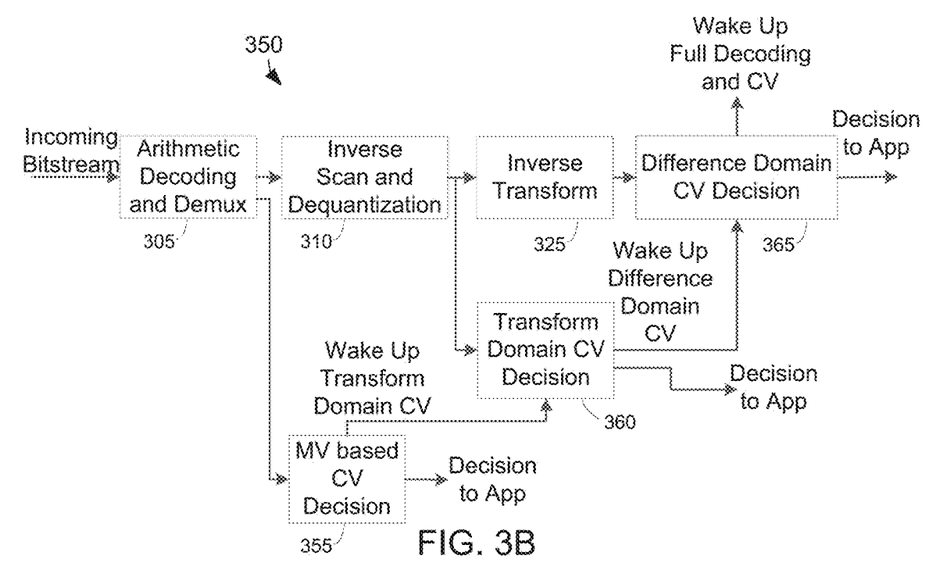
FIG. 3B illustrates an example of a block diagram for a system for hierarchical/progressive video decoding for a CV system in accordance with various embodiments of the present disclosure.

FIG. 3B illustrates an example of a block diagram for a system 350 for hierarchical/progressive video decoding for a CV system in accordance with various embodiments of the present disclosure. For example, the decoding system 350 depicted in FIG. 3B may be one embodiment of the processing system 200 in FIG. 2 or any one of the server 104 or one or more of the electronic devices 106-114 in FIG. 1. The embodiment of the decoding system 350 shown in FIG. 3B is for illustration only. Other embodiments of the decoding system 350 could be used without departing from the scope of this disclosure.

The decoding system 350 implements hierarchical/progressive video decoding technique by making CV decisions at one or more stages of the video decoding process. As used herein, a decision, when used with reference to a video stream being decoded for a CV system, means a determination of whether the useful information for the CV system can be identified from the partially decoded video stream at the current stage of the decoding. For example, the partially decoded video stream is decoded enough for the CV system to use for the desired or required task being performed by the CV application or system. In other words, the decoding system 350 implements a hierarchical/progressive "wake up" methodology to "wake up" the CV system during the decoding process. This can save significant power by relying where earlier parts of the decoding process and analyzing partially decoded stream to determine if the full CV system needs to be engaged for a CV decision. This system is further useful for applications where the CV system is operating for long periods of time but a meaningful decision is expected only in fraction of a time (e.g., premises monitoring using a surveillance camera).

As illustrated, after arithmetic decoding and demux by block 305, the MV based CV decision block 355 makes a determination of whether the CV decision can be made using the motion vectors. If so, the MV based CV decision block 355 provides the decision to the CV system for the CV system to perform the CV task based on the partially decoded video stream, for example, without any further decoding of the video stream being required. For example, the MV based CV decision block 355 can use motion vectors to determine whether there is human activity detected in a scene without full decoding of the video stream.

Figure 4:
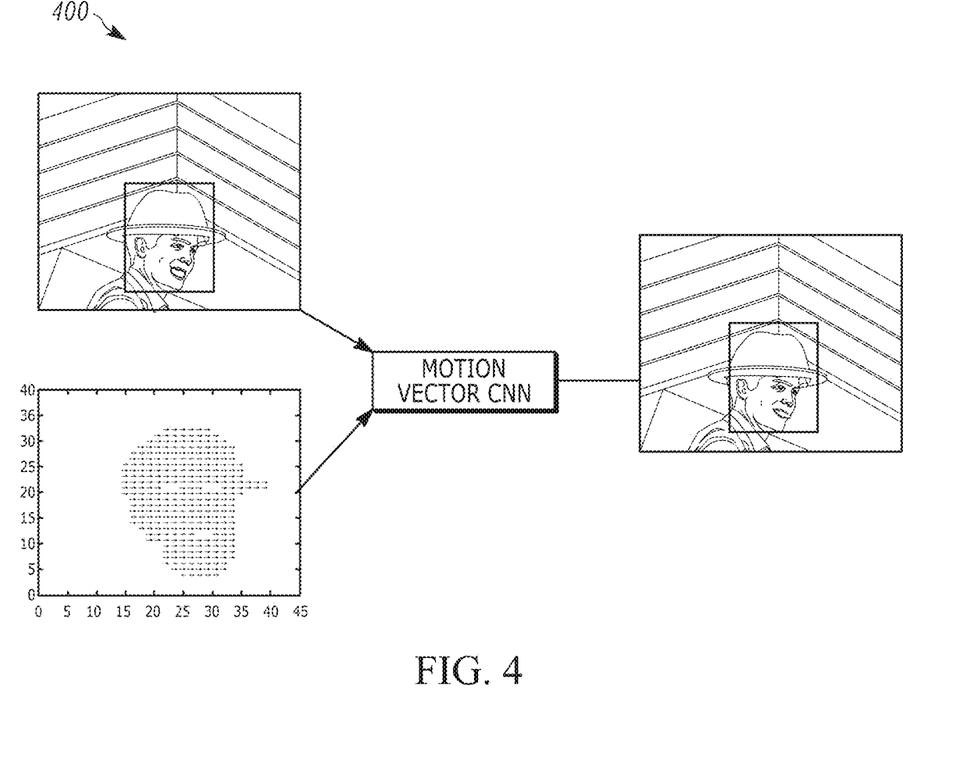
FIG. 4 illustrates an example of progressive, compressed-domain video decoding using a motion vector CNN in accordance with various embodiments of the present disclosure.

FIG. 4 illustrates an example of progressive, compressed-domain video decoding using a motion vector CNN in accordance with various embodiments of the present disclosure. For example, the motion vector based object detection for the CNN may be implemented by the MV based CV decision block 355 in FIG. 3B. The example of the progressive, compressed-domain video decoding using a motion vector CNN shown in FIG. 4 is for illustration only. Other applications of the progressive, compressed-domain video decoding could be used without departing from the scope of this disclosure.

FIG. 4 shows an example of motion vector based object detection for a CNN. The input to the CNN is the motion vector of the inter frame and the object bounding box that is detected from the previous intra frame. The CNN is trained to perform regression on the bounding box coordinates in the inter frame and generate a confidence score for the regressed box coordinates. If the confidence score is greater than or equal a predefined threshold, the CV decision block 355 provides the CV decision to the CV system to perform the CV task based on the partially decoded video stream. For example, the CV system may be monitoring a scene to detect object movement. Using just the motion vector, the CNN can detect the object movement and provide the results to the CV system for the CV system to perform the associated task. If the confidence score is less than the predefined threshold, the transform domain CNN will be woken up, for example, as discussed below with regard to the transform domain CV decision block 360.

Returning to the discussion of FIG. 3B, if the CV decision cannot be made at block 355, the transform domain based CV decision block 360 makes a determination of whether the CV decision can be made using the output from the inverse scan and dequantization block 310. For example, the transform domain based CV decision block 360 can use discrete cosine transform (DCT) coefficients output by block 310 to determine whether the CV decision can be made. If so, the transform domain based CV decision block 360 provides the decision to the CV system for the CV system to perform the CV task based on the partially decoded video stream, for example, without any further decoding of the video stream being required. For example, the transform domain CV decision block 360 can use transform coefficients to perform facial detection in a scene without full decoding of the video stream.

Figure 5:
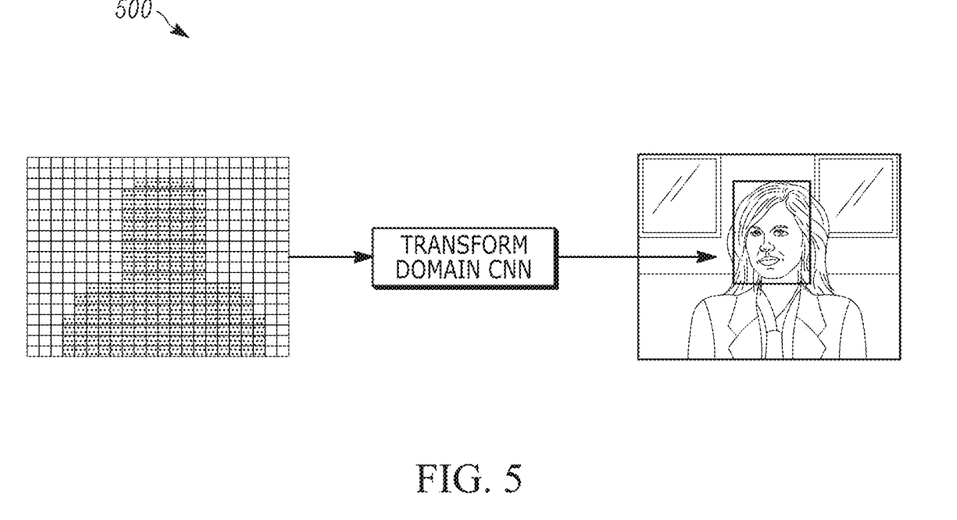
FIG. 5 illustrates an example of progressive, compressed-domain video decoding using a transform domain CNN in accordance with various embodiments of the present disclosure.

FIG. 5 illustrates an example of progressive, compressed-domain video decoding using a transform domain CNN in accordance with various embodiments of the present disclosure. For example, the transform domain object detection for the CNN may be implemented by the transform domain based CV decision block 360 in FIG. 3B. The example of the progressive, compressed-domain video decoding using a transform domain CNN shown in FIG. 5 is for illustration only. Other applications of the progressive, compressed-domain video decoding could be used without departing from the scope of this disclosure.

FIG. 5 shows an example of the transform domain CNN for object detection. The input to the CNN is the transform coefficients blocks. The CNN is trained to predict the object bounding boxes and generate a confidence score for its prediction. If the confidence score is greater than or equal a predefined threshold, the transform domain based CV decision block 360 provides the CV decision to the CV system to perform the CV task based on the partially decoded video stream. For example, the CV system may be monitoring a scene to identify the presence of a particular object within the scene. If the confidence score is less than the predefined threshold, the fully decoded image based CNN will be woken up, for example, as discussed below with regard to the transform domain CV decision block 360. If the confidence score is greater than or equal a predefined threshold, the transform domain based CV decision block 360 provides the CV decision to the CV system to perform the CV task based on the partially decoded video stream. For example, the CV system may be monitoring a scene to detect object movement. Using transform coefficients, the CNN can detect the object movement and provide the results to the CV system for the CV system to perform the associated task. If the confidence score is less than a predefined threshold, the difference domain CNN will be woken up, for example, as discussed below with regard to the difference domain CV decision block 365.

Returning to the discussion of FIG. 3B, if the CV decision cannot be made at block 360, the difference domain based CV decision block 365 makes a determination of whether the CV decision can be made using the output from the inverse transform block 325. For example, the difference domain based CV decision block 365 can use frame differences or intra frames to determine whether the CV decision can be made. If so, the difference domain based CV decision block 365 provides the decision to the CV system for the CV system to perform the CV task based on the partially decoded video stream, for example, without any further decoding of the video stream being required. On the other hand, if the decoding system 350 cannot make the CV decision at any of the earlier stages of the decoding process, the decoding system 350 performs full decoding of the video stream and wakes up the CV system to perform the CV task based on the fully decoded video stream.

While certain decoding decision examples are discussed in the context of CNNs, the present disclosure is not limited thereto. For example, any neural network architectures can be used including recurrent neural networks (RNN), attention models, and/or memory networks. Additionally, human movement and face detection are discussed above are examples and other applications of the progressive compressed domain application of CV and DL systems may be utilized including, for example, without limitation, event/outbreak detection, action recognition, object recognition, object tracking, pixel-level scene depth estimation, pixel-level semantic object segmentation, pixel-level Saliency detection, and simultaneous localization and mapping (SLAM) for robotics.

In some embodiments, the decoder 350 may process the incoming bitstream dynamically based on a type of application of the CV system for which the decoding is performed. For example, for some applications, useful information may not be obtainable from the partially decoded video stream. In these instances, the decoder 350 may fully decode the video data without performing progressive decoding on the video stream.

Figure 6:
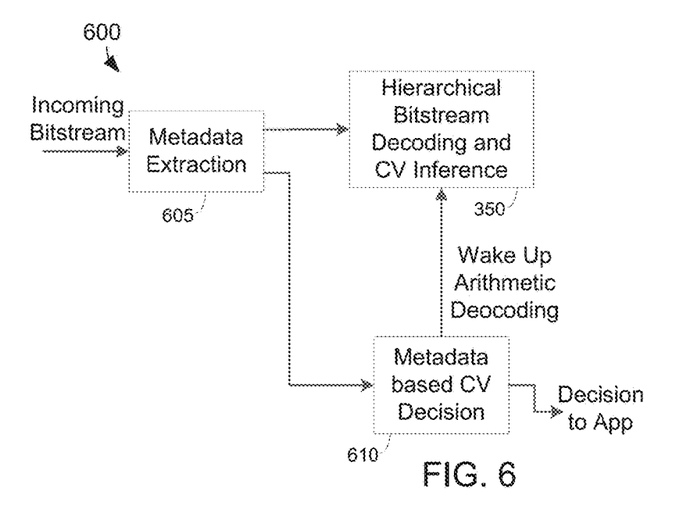
FIG. 6 illustrates an example of a block diagram for a system for hierarchical/progressive video decoding with metadata processing for a CV system in accordance with various embodiments of the present disclosure.

FIG. 6 illustrates an example of a block diagram for a system 600 for hierarchical/progressive video decoding with metadata processing for a CV system in accordance with various embodiments of the present disclosure. For example, the system 600 depicted in FIG. 6 may be one embodiment of the processing system 200 in FIG. 2 or any one of the server 104 or one or more of the electronic devices 106-116 in FIG. 1. The embodiment of the system 600 shown in FIG. 6 is for illustration only. Other embodiments of the system 600 could be used without departing from the scope of this disclosure.

In this embodiment, the decoding system 600 includes an additional metadata layer to the hierarchical/progressive video decoding system. In this example, the incoming bitstream has additionally encoded metadata which is extracted at block 605 for the metadata based CV decision block 610 to make a CV decision based on the metadata. For example, the video streams is augmented to provide different "side information" to aid downstream CV/DL tasks. Such information may include feature points location and descriptions (such as speed up robust features (SURF), scale-invariant feature transform (SIFT), oriented features from accelerated segment test (FAST) and rotated binary robust independent elementary features (BRIEF) (ORB), etc.); localized histograms of gradients; and/or custom CV features such as gradients, corners, lines, object locations or coordinates (such as face, human, hands, etc.).

If the metadata based CV decision block 610 can make the CV decision, the system 600 provides the decision to the decision to the CV system for the CV system to perform the CV task based on the partially decoded video stream, for example, without any further decoding of the video stream being required. On the other hand, if the metadata based CV decision block 610 cannot make the CV decision, the decoding system 600 continues to perform hierarchical bitstream decoding and CV inference as discussed above with regard to decoding system 350.

Figure 7:
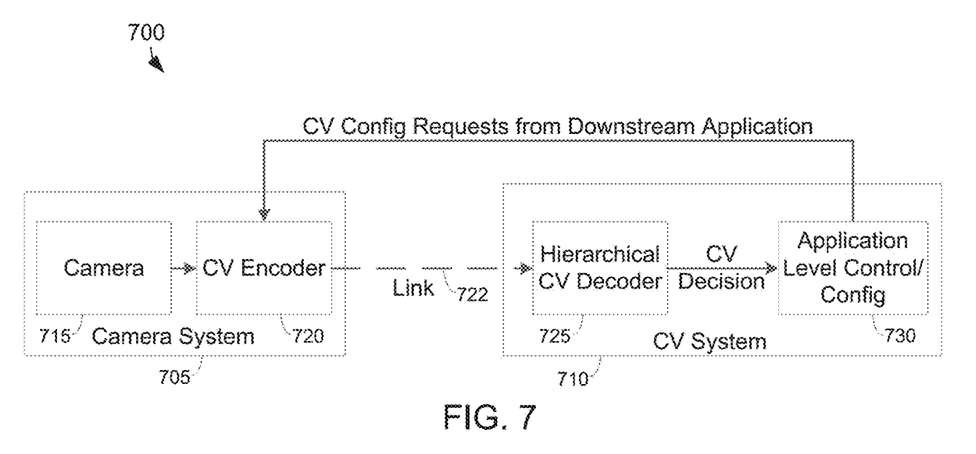
FIG. 7 illustrates an example of a block diagram for a system for video encoding and decoding for a CV system in accordance with various embodiments of the present disclosure.

FIG. 7 illustrates an example of a block diagram for a system 700 for video encoding and decoding for a CV system in accordance with various embodiments of the present disclosure. The embodiment of the system 700 shown in FIG. 7 is for illustration only. Other embodiments of the system 700 could be used without departing from the scope of this disclosure.

In this embodiment, the system 700 includes a camera system 705 which includes a camera 715 and CV encoder 720. For example, the camera system 705 may be an embodiment of the camera system 115 in FIG. 1 and the CV encoder 720 may be implemented by the processing system 200 in FIG. 2. The camera 715 captures video data for encoding by the CV encoder 720. The CV encoder 720 is an encoder that encodes video data to reduce power by encoding the video data for CV consumption. For example, in some embodiments, the CV 720 encoder can use transforms that are more suitable for CV/DL tasks that optimize or improve both compression efficiency as well as a DL/CNN detection and recognition efficiency. In another example, the encoder 720 can include any or all of the metadata in the video stream for CV decoding as discussed above with regard to FIG. 6. In some embodiments, the encoder 720 can generate a bitstream using markers to denote regions of interest ROIs around possible objects of interests that can enable the downstream CV system 710 to decode only the relevant part of the video image. The encoded video is sent over a communications link 722 such as a network connection to the CV system 710.

The CV system 710 is a system for processing video data to perform a CV task or for a CV application. The CV system 710 includes a hierarchical CV decoder 725 that decodes the video stream and provides a CV decision for the CV system 710 as discussed above with regard to decoder systems 350 or 600. Additionally, the CV system 710 includes an application level control/configuration block 730 that provides control and configuration for the CV application being performed by the CV system 710. For example, the application level control/configuration block 730 can request the CV encoder 720 to prioritize encoding of or include a certain type of metadata depending on the need of the CV task (e.g., such as ROI selection for human detection and recognition, selection of CV/DL features, etc.) for the CV system 710.

In various embodiments, the CV encoder 720 performs adaptive video encoding for CV consumption versus human consumption. For example, the CV encoder 720 can code frames on key events only (e.g., human detected) to reduce bandwidth. In another example, the CV encoder 720 may encode the video using a customized codec for progressive decoding/CV consumption as disclosed herein. In one example thereof, the CV encoder 720 can assign more bits to key objects to aid detection (e.g., of a person, car, etc.). In another example, the CV encoder 720 can add additional resolution for key ROIs, such as by adding a layer with enhanced resolution.

In one example of video surveillance encoding and decoding, most surveillance videos are only reviewed by a human retrospectively when an outbreak or significant event has happened (a "positive"). The majority of the video recordings are never reviewed by a human ("negatives"). In this example, the CV system 710 is used an object detection or event/outbreak detection with approximately 100% recall rate (recall rate means among the positives, how many of them are detected) and a moderate precision rate (precision rate means among the predicted positives, how many are truly positives). In this example, the CV encoder 720 encodes each frame with different bitrate depending on a detection score. When the score is high, then a higher bitrate is used (so that the frames can be consumed/reviewed by a human); when the score is low, the scene is most likely a negative and therefore will not need to be reviewed. As the majority of frames in a surveillance video are negatives, such an adaptive encoding scheme can not only reduce communication bandwidth, but also make decoding more efficient.

Figure 8:
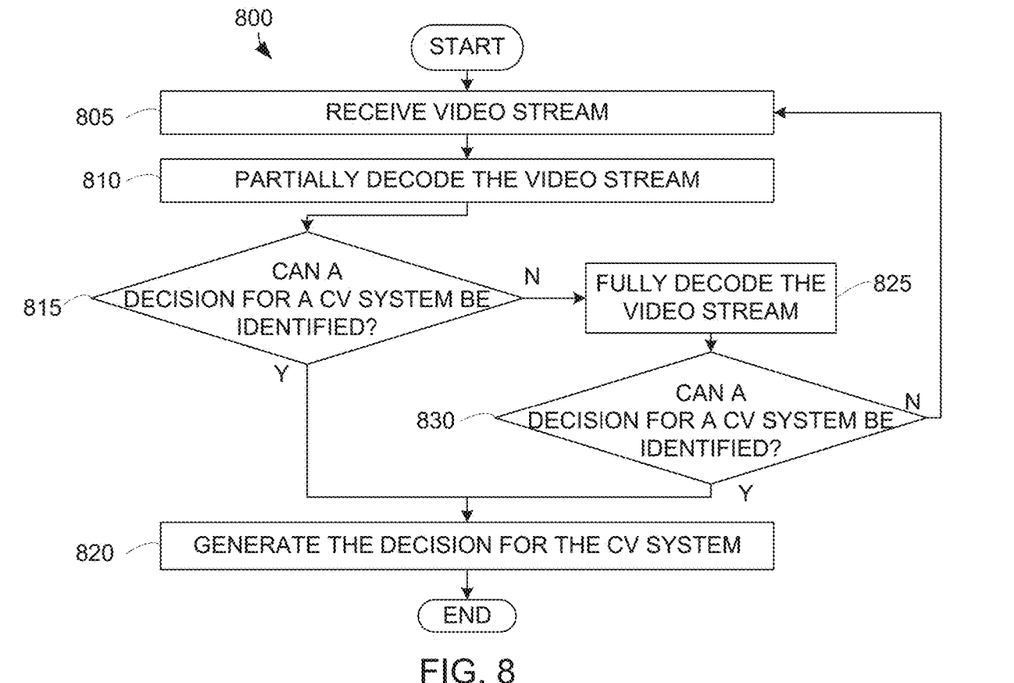
FIG. 8 illustrates a flowchart of a process for decoding video data for a CV system in accordance with various embodiments of the present disclosure.

FIG. 8 illustrates a flowchart of a process for decoding video data for a CV system in accordance with various embodiments of the present disclosure. For example, the process depicted in FIG. 8 may be performed by the processing system 200 in FIG. 2; the process may also be implemented by any one of the server 104 or one or more of the electronic devices 106-114 in FIG. 1 collectively or individually referred to as the system.

The process begins with the system receiving a video stream (step 805). For example, in step 805, the video to be decoded is encoded for multi-stage decoding and used in an application for a CV system. As part of this step or prior thereto, the system may request from an encoder of the video stream (e.g., encoder 720) the inclusion of the metadata for the video stream based on the application for the CV system to try to simplify the decoding.

The system then partially decodes the video stream (step 810). For example, in step 810, the system partially decodes the video stream by performing a stage of the multi-stage decoding such as discussed above with regard to decoder systems 350 and 600. This step may also include extracting metadata included or encoded with the video stream. For example, in some embodiments, the system may identify one or more markers in the metadata indicating a ROI in one or more frames of the video stream and partially decoding the video stream by identifying the one or more markers for decoding of just the ROI based on the identified markers. In another example, the metadata may indicate that the current portion of the video stream does not contain relevant information for the CV system and does not need to be decoded.

Thereafter, the system determines whether a decision for a CV system can be identified (step 815). For example, in step 815, the system determines whether the decision can be made based on the partially decoded video stream at the current stage of decoding. In embodiments where CV specific metadata is included with the video stream, the system may determine whether the decision for the CV system can be identified based on the extracted metadata prior to partially decoding the actual video in the video stream. As part of this step, the system may progressively decode the video stream in stages while determining whether the decision for the CV application can be identified after one or more of the decoding stages until identifying that the decision can be made or the video is completely decoded in step 825, discussed below, for the determination of whether the decision can be made based on the fully decoded video stream.

If the decision can be identified, the system then generates the decision for the CV system (step 820). For example, in step 820, the system provides the decision and partially decoded video stream for the CV system to perform desired or needed tasks and stops the decoding of the video stream without needing to fully decode the video stream.

However, if at step 815, the decision cannot be identified based on the partially decoded video stream, the system fully decodes the video stream (step 825). Thereafter, the system determines whether a decision for a CV system can be identified based on the fully decoded video stream (step 830). If the decision can be identified, the system then generates the decision for the CV system (step 820). For example, in step 820, the system provides the decision and decoded video stream for the CV system to perform desired or needed tasks.

However, if at step 830, the decision cannot be identified based on the fully decoded video stream, the system returns to step 805 to continue to receive and decode the video steam.

Figure 9:
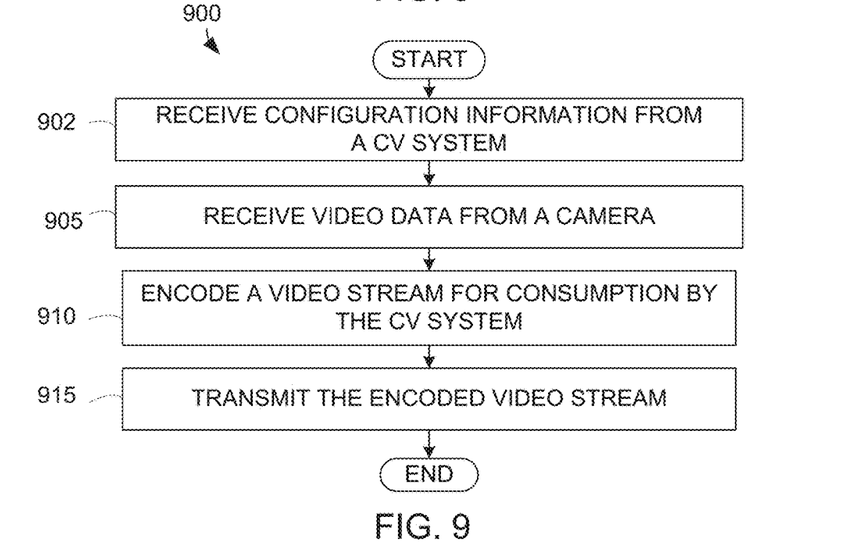
FIG. 9 illustrates a flowchart of a process for decoding video data for a CV system in accordance with various embodiments of the present disclosure.

FIG. 9 illustrates a flowchart of a process for decoding video data for a CV system in accordance with various embodiments of the present disclosure. For example, the process depicted in FIG. 9 may be performed by the processing system 200 in FIG. 2; the process may also be implemented by the camera system 115 in FIG. 1 collectively or individually referred to as the system.

The process begins with the system receiving configuration information from a CV system (step 902). For example, in step 902, the system may receive configuration information about how to encode the video, what metadata to include with the video, or criteria on whether to encode certain frames of the video at all. Thereafter, the system receives video data from a camera (step 905). For example, in step 905, the system include a camera such as camera 715 that generates video for use by a CV system.

The system then encodes a video stream for consumption by a CV system (step 905). For example, in step 905, the system may receive, from a decoder of the video stream, a request for inclusion of metadata for the video stream based on an application for the CV system prior to encoding of the video stream and include the requested metadata with the encoded video stream. In another example, the system may include metadata with the encoded video stream to indicate whether a decision for the CV system can be identified from the metadata. In another example, the system may detect an event for the CV system and then only encode the video frames that are associated with the detected event as the video stream to reduce bandwidth. In another example, the system may identify objects of interest to the CV system and encode frames including the identified objects to have additional bits encoded for the identified objects. In other examples, the system may include one or more markers indicating a ROI in one or more frames of the video stream.

The system then transmits the encoded video stream (step 910). For example, in step 910, the system transmits the encoded video stream to a decoder for decoding for the CV system.

Although FIGS. 8 and 9 illustrate examples of processes for decoding and encoding video data, respectively, various changes could be made to FIGS. 8 and 9. For example, while shown as a series of steps, various steps in each figure could overlap, occur in parallel, occur in a different order, or occur multiple times. In another example, steps may be omitted or replaced by other steps.

Embodiments of the present disclosure provide for progressive compressed domain application of CV and DL systems. In so doing, various embodiments reduce the complexity and power consumption for video consumption in CV applications.

Although the present disclosure has been described with an exemplary embodiment, various changes and modifications may be suggested to one skilled in the art. It is intended that the present disclosure encompass such changes and modifications as fall within the scope of the appended claims.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle.

What is claimed is:

1. A method for decoding video data, the method comprising:
   receiving a video stream that is encoded for multi-stage decoding;
   partially decoding, using a processor, the video stream by performing a first stage of the multi-stage decoding;
   determining, using the processor, whether a decision for a computer vision system can be identified based on the video stream partially decoded by the first stage;
   when determined that the decision cannot be identified based on the video stream partially decoded by the first stage, partially decoding, using the processor, the video stream as partially decoded by the first stage by performing a second stage of the multi-stage decoding;
   determining, using the processor, whether the decision for the computer vision system can be identified based on the video stream partially decoded by the second stage;
   when determined that the decision cannot be identified based on the video stream partially decoded by the second stage, partially decoding, using the processor, the video stream as partially decoded by the second stage by performing a third stage of the multi-stage decoding;
   determining, using the processor, whether the decision for the computer vision system can be identified based on the video stream partially decoded by the third stage; and
   generating the decision for the computer vision system based on the partial decodings of the video stream.

2. The method of claim 1, further comprising:
   in response to determining that the decision for the computer vision system can be identified after a specified stage of the multi-stage decoding, generating the decision and stopping the decoding of the video stream.

3. The method of claim 1, further comprising:
   extracting metadata for the video stream prior to decoding of the video stream; and
   determining whether the decision for the computer vision system can be identified based on the extracted metadata.

4. The method of claim 3, further comprising:
   requesting, from an encoder of the video stream, inclusion of the metadata for the video stream based on an application for the computer vision system prior to receipt of the video stream.

5. The method of claim 3, further comprising:
   determining whether frames of the video stream need to be decoded for the computer vision system based on the extracted metadata prior to partially decoding the video stream.

6. The method of claim 1, wherein:
   the video stream includes one or more markers indicating a region of interest (ROI) in one or more frames of the video stream; and
   the partial decoding by the first stage, the partial decoding by the second stage, and the partial decoding by the third stage each includes partially decoding the ROI based on the one or more markers.

7. The method of claim 1, wherein the video stream includes frames that are encoded based on detection of an event for the computer vision system.

8. The method of claim 1, wherein the video stream includes frames having additional bits encoded for objects located in the frames.

9. A system for decoding video data, the system comprising:
   a communication interface configured to receive a video stream that is encoded for multi-stage decoding; and
   a processor operably connected to the communication interface, the processor configured to:
   partially decode the video stream by performing a first stage of the multi-stage decoding;
   determine whether a decision for a computer vision system can be identified based on the video stream partially decoded by the first stage;
   when determined that the decision cannot be identified based on the video stream partially decoded by the first stage, partially decode the video stream as partially decoded by the first stage by performing a second stage of the multi-stage decoding;
   determine whether the decision for the computer vision system can be identified based on the video stream partially decoded by the second stage;
   when determined that the decision cannot be identified based on the video stream partially decoded by the second stage, partially decode the video stream as partially decoded by the second stage by performing a third stage of the multi-stage decoding;

determine whether the decision for the computer vision system can be identified based on the video stream partially decoded by the third stage; and generate the decision for the computer vision system based on the partial decodings of the video stream.

10. The system of claim 9, wherein the processor is further configured to generate, in response to determining that the decision for the computer vision system can be identified after a specified stage of the multi-stage decoding, the decision and stop the decoding of the video stream.

11. The system of claim 9, wherein the processor is further configured to:

extract metadata for the video stream prior to decoding of the video stream; and determine whether the decision for the computer vision system can be identified based on the extracted metadata.

12. The system of claim 11, wherein the communication interface is further configured to request, from an encoder of the video stream, inclusion of the metadata for the video stream based on an application for the computer vision system prior to receipt of the video stream.

13. The system of claim 11, wherein the processor is further configured to determine whether frames of the video stream need to be decoded for the computer vision system based on the extracted metadata prior to partially decoding the video stream.

14. The system of claim 9, wherein:

the video stream includes one or more markers indicating a region of interest (ROI) in one or more frames of the video stream; and the partial decoding by the first stage, the partial decoding by the second stage, and the partial decoding by the third stage each includes partially decoding the ROI based on the one or more markers.

15. The system of claim 9, wherein the video stream includes frames that are encoded based on detection of an event for the computer vision system.

16. The system of claim 9, wherein the video stream includes frames having additional bits encoded for objects located in the frames.

17. A system for encoding video data, the system comprising:

a processor configured to:

receive, from a decoder, configuration information including one or more criteria to only encode video frames associated with an event after the event is detected;

receive the video data from a camera;

detect the event for a computer vision system in the video data after receiving the configuration information;

encode, based on the one or more criteria received before the event is detected, the video frames associated with the detected event in the video data in response to detecting the event in the video data received from the camera into a video stream for consumption by the computer vision system; and include metadata with the encoded video stream to indicate whether a decision for the computer vision system can be identified from the metadata, wherein the metadata indicates whether the decision can be made after partial decoding by a first stage, partial decoding by a second stage, and partial decoding by a third stage of a multi-stage decoding; and a communication interface operably connected to the processor, the communication interface configured to transmit the encoded video stream and the metadata to the decoder for the computer vision system.

18. The system of claim 17, wherein the communication interface is further configured to receive, from the decoder of the video stream, a request for inclusion of the metadata for the video stream based on an application for the computer vision system prior to encoding of the video stream.

19. The system of claim 17, wherein, to encode the video stream, the processor is configured to:

identify objects of interest to the computer vision system; and encode frames including the identified objects to have additional bits encoded for the identified objects.

20. The system of claim 17, wherein, to encode the video stream, the processor is configured to:

identify a region of interest (ROI) to the computer vision system; and encode frames including one or more markers indicating the ROI.

* * * * *